United States Patent
Boshoff et al.

(10) Patent No.: US 10,572,099 B2
(45) Date of Patent: Feb. 25, 2020

(54) DYNAMIC INFORMATION TRANSFER FROM DISPLAY TO CONTROL

(71) Applicant: Flow Labs, Inc., Menlo Park, CA (US)

(72) Inventors: Hendrik Frans Verwoerd Boshoff, Stellenbosch (ZA); Willem Morkel Van Der Westhuizen, Stellenbosch (ZA); Jan Pool, Stellenbosch (ZA); Adri Smuts, Durbanville (ZA)

(73) Assignee: Flow Labs, Inc., Menlo Park, CA (US)

( * ) Notice: Subject to any disclaimer, the term of this patent is extended or adjusted under 35 U.S.C. 154(b) by 602 days.

(21) Appl. No.: 15/120,242

(22) PCT Filed: Feb. 20, 2015

(86) PCT No.: PCT/ZA2015/000009
§ 371 (c)(1),
(2) Date: Aug. 19, 2016

(87) PCT Pub. No.: WO2015/127485
PCT Pub. Date: Aug. 27, 2015

(65) Prior Publication Data
US 2017/0068415 A1 Mar. 9, 2017

(30) Foreign Application Priority Data
Feb. 21, 2014 (ZA) .................................. 2014/01316

(51) Int. Cl.
*G06F 3/048* (2013.01)
*G06F 3/0481* (2013.01)
(Continued)

(52) U.S. Cl.
CPC ........ *G06F 3/04812* (2013.01); *G06F 3/0482* (2013.01); *G06F 3/0488* (2013.01);
(Continued)

(58) Field of Classification Search
CPC ..... G06F 3/041; G06F 3/04812; G06F 3/0482
(Continued)

(56) References Cited

U.S. PATENT DOCUMENTS

| 7,434,177 B1 | 10/2008 | Ording et al. |
| 2010/0328351 A1* | 12/2010 | Tan .......................... G06F 3/041 345/661 |
| 2011/0141031 A1 | 6/2011 | McCullough et al. |

FOREIGN PATENT DOCUMENTS

WO  WO 2014/161011 A1  10/2014

OTHER PUBLICATIONS

"Apple-Mac OSX Theater Meet the Dock," May be retrieved at<http://web.archive.org/web/20010123211200/http://www.apple.com/macosx/theater/dock.html>.
(Continued)

*Primary Examiner* — Andrey Belousov
(74) *Attorney, Agent, or Firm* — Fenwick & West LLP

(57) ABSTRACT

The invention provides, a method for human-computer interaction on a graphical user interface (GUI). The method includes the steps of receiving first control coordinates for individualised control of a plurality of objects to be controlled—by pointer coordinates; receiving display coordinates for the display' of the' plurality of objects, which relate to but are different from the first control coordinates; receiving pointer coordinates for individualised control of the objects based partly on the first control coordinates; using the display coordinates of at least one object to—calculate new control coordinates associated with the same object, which new control coordinates generally correspond to the same objects display coordinates; and—continuously repeating the above steps each time new pointer coordinates become available.

6 Claims, 5 Drawing Sheets

(51) Int. Cl.
*G06F 3/0484* (2013.01)
*G06F 3/0488* (2013.01)
*G06F 3/0482* (2013.01)

(52) U.S. Cl.
CPC ...... *G06F 3/04842* (2013.01); *G06F 3/04886* (2013.01); *G06F 2203/04805* (2013.01); *G06F 2203/04808* (2013.01)

(58) Field of Classification Search
USPC .................................................. 715/702, 838
See application file for complete search history.

(56) References Cited

OTHER PUBLICATIONS

Blanch, R. et al., "Semantic Pointing: Improving Target Acquisition with Control-Display Ratio Adaptation," CHI Letters, Apr. 24-29, 2004, pp. 519-526, vol. 6, No. 1.
Boshoff, H.F.V., "Position Dependent Control of the Trade-Off Between Rate of Navigation and Ease of Acquisition in a Distortion Based Graphical User Interface," RealityGate, RG-C Introduction, Version 0.7, Dec. 14, 2012, pp. 1-11.
Boshoff, H.F.V., "Distortion Viewing with Improved Focus Targeting," RealityGate, RG-N1 Introduction, RG-N Draft v.0.67, Feb. 6, 2013, pp. 1-26.
Cockburn, A. et al., "A Review of Overview + Detail, Zooming and Focus + Context Interfaces," ACM, 2008, pp. 1-31, vol. 41, No. 1.
Leung, Y. et al., "A Review and Taxonomy of Distortion-Oriented Presentation Techniques," ACM, 1994, pp. 126-160, vol. 1, No. 2.
McGuffin, M. et al., "Acquisition of Expanding Targets," Proc. SIGCHI Conf. Human Factors in Computing Systems (CHI'02), ACM, New York, NY, 2003, pp. 57-64, vol. 4, Issue 1.
Sarkar, M. et al., "Graphical Fisheye Views of Graphs," Proc. ACM, CHI'92, 1992, pp. 83-91.
Zhai, S. et al., "Human On-Line Response to Target Expansion," Conference Proceedings Conference on Human Factors in Computing Systems, CHI Letters, Apr. 5-10, 2003, pp. 177-184, vol. 5, No. 1.
Patent Cooperation Treaty, International Search Report, International Patent Application No. PCT/ZA2015/000009, dated Jan. 7, 2016, 3 Pages.
Patent Cooperation Treaty, Written Opinion of the International Searching Authority, International Patent Application No. PCT/ZA2015/000009, dated Jan. 7, 2016, 10 Pages.

\* cited by examiner

FIG. 3

DYNAMIC INFORMATION TRANSFER FROM DISPLAY TO CONTROL

TECHNICAL FIELD OF THE INVENTION

This invention relates to a method for human-computer interaction on a graphical user interface (GUI).

BACKGROUND

Affordance is an important aspect of any GUI, because the user must be able to figure out what can be done with the visible objects by applying the general conventions of GUI interaction. In the usual case of static objects, an object can be acted upon by pointing at the area where it is seen, and then touching or clicking inside the area.

A display based on dynamic distortion complicates this simple pointing procedure. With distortion together with magnification for example, the objects' display sizes depend on the changing pointer position. But the objects are also displaced in the direction opposite to the pointer movement. When pointing to where an object was previously seen, the user may find that the object is no longer there to be acted upon, because the object itself has moved, in this sense, distortion is defined as the decoupling of the control coordinates of an object from its display coordinates.

In Patent Cooperation Treaty application No. PCT/ZA2014/000013, the applicants described an invention in which they addressed the problem of difficult focus targeting that appears when navigating a distortion display, by introducing a focal dip into the magnification function and by controlling the object scaling separately from the magnification of the background space.

Distortion induced decoupling between control and display coordinates will disrupt interaction if the user relies purely on ballistic movements and muscle memory. Nevertheless, as long as the changing pointer position remains a fixed point of the distortion function, such as with fish eye magnification, visually guided interaction remains possible. Such interaction benefits from the visual magnification even though there may be no motor advantage.

Distortion displays are known n the art. The one with the widest public deployment may be the Apple Dock implementation of a fish-eye view effect on the icons of a userbar [1].

Transfer of information from display to control in the context of the Apple Dock has been implicitly proposed by Zhai et al [2]. Their method involves freezing the display for a second or so on entry of the pointer into the userbar. The frozen display coordinates are then interpreted as control coordinates during the freeze, after which those coordinates lapse tack to being dynamic, and are used again purely for display. This technique amounts to a once-off information transfer from display to control at the instant of pointer entry into the userbar.

Another application of the discrete transfer from display to control may be found in the Semantic Pointing technique of Blanch et al [3]. When the display boundaries of certain regions on the screen are crossed by the pointer, the C-D ratio of the input device is adapted in a single step. This has the effect of changing the size of those regions in motor space, making selection easier or more difficult, depending on the slope of the C-D function.

However, these methods are discrete, with sudden changes, and "movement" of the objects rely on computer animation instead of being controlled by the user.

It is an object of this invention to provide an improved method for human computer interaction, which exploits advantageously the decoupling of control and display in distortion scenarios.

REFERENCES

[1] Bas Ording, Steven P Jobs and Donald J Lindsay, "User Interface for Providing Consolidation and Access," U.S. Pat. No. 7,434,177, October 2008.
[2] Shumin Zhai, Stephane Conversy, Michel Beaudouin-Lafon and Yves Guiard, "*Human On-line Response to Target Expansion*," CHI Letters. Vol. 5 No 1, 2003, pp 177-184.
[3] Renaud Blanch, Yves Guiard and Michel Beaudouin-Lafon, "*Semantic Pointing: Improving Target Acquisition with Control-Display Patio Adaptation*," CHI Letters, Vol. 6 No 1, 2004, pp 519-526.

GENERAL DESCRIPTION OF THE INVENTION

The inventors realised that the difference between the decoupled geometrical coordinates (e.g. position and size) of objects with respect to control and display in a distortion display, creates an opportunity that does not exist in the traditional GUI, where display and control coordinates are tightly coupled. The opportunity is to dynamically transfer information related to coordinates used for display to coordinates to be used for control. In other words, an object which is displayed at coordinates different from that object's control coordinates cannot be interacted with at the display coordinates. The display coordinates are then used to calculate additional or new control coordinates. The new or additional control coordinates can then be used to interact with the object. These steps are to be repeated each time the display coordinates change to give a continuous and dynamic effect, which is under control of the user instead of an animation generated by a computer.

It is to be appreciated that in the familiar operations of zooming, panning, scrolling and object displacement, the control and display coordinates all move, strictly in tandem, i.e. no distortion with decoupling, and the proposed transfer would have no effect. What is needed is a differential or decoupling between control and display coordinates, and such a differential may be provided by a distortion display.

According to the invention there is provided a method for human-computer interaction (HCl) on a graphical user interface (GUI), which method includes the steps of:

receiving first control coordinates for individualised control of a plurality of objects to be controlled by pointer coordinates:

receiving display coordinates for the display of the plurality of objects, which relate to but are different from the first control coordinates;

receiving pointer coordinates for individualised control of the objects based partly on the first control coordinates;

using the display coordinates of at least one object to calculate new control coordinates associated with the sane object, which new control coordinates generally correspond to the same object's display coordinates; and continuously repeating the above steps each time new pointer coordinates become available.

"Individualised control of a plurality of objects" means that the objects will respond individually and differently to the same change in pointer coordinates, as is the case in a distortion display. Individualised control is in contrast to the standard GUI practice, where control of a plurality of objects subjects all of them to a single joint linear transformation like translation (e.g. scrolling), scaling (e.g. zooming), rotation or reflection.

The new control coordinates may be used together with further, separate, pointer coordinates for object control and the method may include receiving such further pointer coordinates.

Receiving or calculating control coordinates may include activation of one or more control functions associated with each of the virtual objects.

In some embodiments of the invention based on touch sensitive screens, the display coordinates would typically be laterally displaced (along an x- and/or y-coordinate) relative to the control coordinates to give a visual advantage in the sense that the pointing object such as a finger does not cover the display of objects of interest to the user. New control coordinates may then be calculated which typically correspond to the display coordinates for control by further pointer coordinates. A person can thus use the finger of his other hand to select the object, for example.

In cases where the position of a pointing object such as a finger can be detected in the space above a touch sensitive screen, the control coordinates may differ from the display coordinates alone a z-axis, placing the control coordinates above the display or screen and above the displayed objects. The new control coordinates may then also include z-axis coordinates, allowing the first pointer to also control the new control coordinates. For example, an object can be selected by moving a pointing finger downwards towards a display along the z-axis. In cases where the new control coordinates are also laterally displaced relative to the first control coordinates a person can also use his other hand's fingers to control the objects.

In some embodiments, the objects can only be controlled by the new control coordinates after a certain threshold with regard to position, size or other characteristic has been reached. In these cases the method includes the step of establishing a threshold with regard to each object or a group of objects.

The invention also extends to a computer device, which is configured to be interacted with according to the method described above.

BRIEF DESCRIPTION OF THE DRAWINGS

FIG. 3 is an initial display of an application receiving first control coordinates of a plurality of tiles.

DETAILED DESCRIPTION OF THE INVENTION

In Example 1, a first example of the invention is briefly described, with more detail in the paper by one of the inventors, entitled "*Deriving motor advantage from display distortion by transferring boundaries from the display space of one pointer to the control space of another pointer.*"

In Example 2, a second example of the invention is described. A working implementation is available using the Leap Motion device as input, and a Python script for processing.

Example 1

In this example, an iPad application (app) receives the first control coordinates of the diminutive QWERTY keyboard, which consists of a plurality of keys. It also receives the keys' initial display coordinates, which are laterally displaced and thus different from their first control coordinates. The initial layout of the keyboard is then displayed. On receiving the pointer coordinates in the form of the touch screen position of the index finger of the left hand, the keyboard is distorted and some keys are differentially displaced and enlarged. This amounts to individualised control of the keys, which get new display coordinates based partly on their first control coordinates. The display coordinates of the keys after distortion, are used to determine new control coordinates, in this case coinciding with these display coordinates. The above steps are continuously repeated as the left index finger moves and new pointer coordinates become available. The app eventually receives further pointer coordinates in the form of the touch screen position of the right hand index finger. These are interpreted in the context of the new control coordinates, to determine which key is selected, and thus which letter is entered into the keyboard buffer. See FIG. 2 of the paper below.

PAPER

Deriving Motor Advantage from Display Distortion by Transferring Boundaries from the Display Space of One Pointer to the Control Space of Another Pointer HIV Boshoff, PhD (Ing)

Introduction

Figure 1:
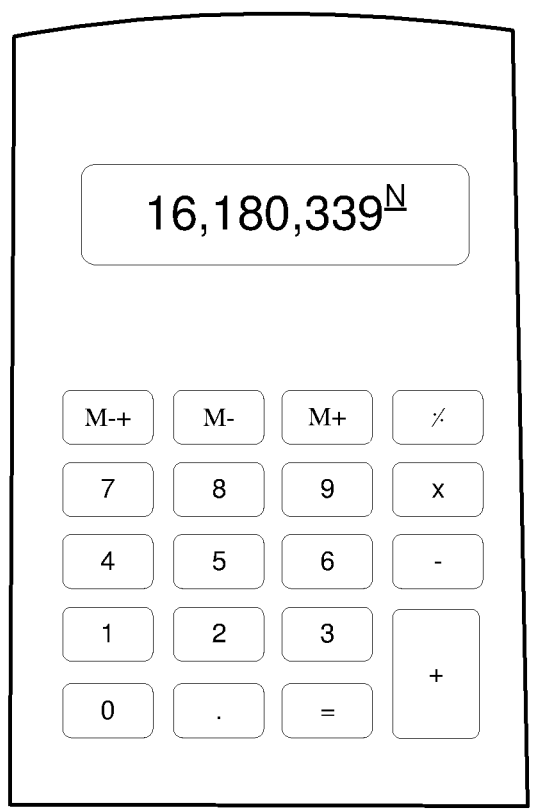
FIG. 1 is a view of a hand-held calculator.

Think of a cheap hand-held calculator, like the Sharp EL-231L (FIG. 1). Its interface has a small display window and a 6×4 array of control keys, with the + key double sized. The display window contains a memory/sign/error indicator and eight display positions for digits, each consisting of seven segments plus a decimal point. Apart from its content, the display window is fixed.

Each of the twenty three keys has a fixed control function, except for a few whose function may depend on the calculator state. Thus the "on" key automatically becomes the "clear" key once the device is switched on. In an important sense, the physical keys with their markings also form an unchangeable part of the device's display, visibly revealing the control position and their functions. Key colour is also used to indicate the function type. See FIG. 1. The Sharp EL-231L calculator This calculator is a marvel of simplicity and affordance, but it can only be used for a strictly limited range of calculations on a narrowly limited range of numbers. The allocation of portions of its display window to the parts of the number to be displayed, the allocation of surface area to each of the visible and usable keys, and the allocation of the discrete keys to the desired control functions, have been fixed once and for all by the device architect.

This machine contrasts sharply with a programmable computational device, based e.g. on touch screen hardware, a virtually continuous pixel display and a graphical user interface (GUI). On such a device, almost everything can be changed, at least by an empowered programmer, but much is also under interactive user control. The scope of the changes may be stated more exactly. The allocation of the device's limited display space to data and to visual representations of the controls, and the allocation of the device's limited control space to control functions can be changed. In other words, control and display space can be reallocated.

Much of the flexibility and power of the GUI resides in this possibility of interactive and dynamic reallocation of control and display space. But such a scheme requires not only ways of doing things such as provided by a calculator, but also meta-ways of changing the ways of doing things, i.e. methods of performing space reallocation. Familiar GUI actions involving reallocation of display space include scrolling, paging, zooming, panning, windowing, launching programs opening menus and performing mouse-overs. These same actions often involve reallocation of control space as well, since the controls may be embedded with the data. The controls for space reallocation include scroll bars, icons, menu headings and window borders.

Controls require display space to be visible and control space to be usable. When a control is moved, it therefore requires dynamic reallocation of both the display space and the control space. A well-known GUI method of moving a control is dragging-and-dropping.

A substantial part of user input during GUI interaction is devoted to the meta-actions of reallocating the control and display spaces. Before a calculator or anything else on it GUI can be used, the user has to grant it space.

Visual and Motor Advantages

The display coverage of an interface element or object may be defined as the fraction of the total display area that it occupies. The visual efficiency of an element would be influenced by its display coverage, the prominence of its colouring, marking, position and shape, and other visually striking properties, like motion. One interface element would have a visual advantage over another one if it has a larger visual efficiency. It seems obvious that visual efficiency is complicated to define and measure and that its value may be subjective, depending e.g. on the user's colour perception and direction of gaze.

Similarly, the control coverage of a control function may be defined as the fraction of the total control surface that may be used to activate it. Complicating this measure is the fact that control areas are often curved surfaces in three dimensions, or that they may be theoretically unbounded, as in the case of the surface on which a mouse moves. The motor efficiency of a function would be influenced by its control coverage, and the position, shape, frictional properties, etc. of its associated control surfaces. One control function would have a motor advantage over another if it has a higher motor efficiency. Motor efficiency, even more than visual efficiency, would seem to be subjective, depending e.g. on the user's handedness, strength and bodily position.

Note that display coverage is a property of an object, while control coverage is a property of a function, although control functions are in general activated by moving control objects. The same function may be activated by two separate objects, whose control coverage should then be added together. Also, while the amount of control and display space allocated to a GUI element like an icon is often equal, this is not always the case. Where indirection of input is used, as in the case of a mouse controlling a cursor on the display, the control-display gain may even be changed during interaction.

For present purposes, and other things being equal, it will be assumed that an increase in control coverage will lead to an increase in motor advantage, independent of the other influences on and the detailed definition of the latter. Similarly, a magnification or increase in display coverage on its own will be assumed to increase visual advantage.

As an example, the upper surface dimensions of the EL-231L calculator is about 70 mm×115 mm for a total area of about 8 050 mm$^2$. The display window measures 10.2% of that. The eighteen ordinary keys each has a relative area of 1.1%, four smaller ones have 0.85% each and the + key has 2.6%. The other 64% of the area is structural and used for branding and physical framing.

Based on the above definitions, we can conclude that the + key has been given a visual advantage of more than 2× over the other grey keys, purely due to its larger display coverage, and ignoring the influence of position. Similarly, the function of the + key (i.e. inserting the addition operator) has been given a motor advantage of more than 2× over the associated functions of the other grey keys, due to its increased control coverage. In this case, the display and control coverages are equal. Furthermore, the display window has a visual advantage of about 9× over each of the ordinary keys. On the other hand, no motor advantage flows from the display window, because the user cannot activate any function via its surface. The distributed nature of the 64% framing area seems to undermine the conclusion that more than half of the control and display area has been wasted. This simple coverage model obviously has its limitations.

For a finished computational device, the total control space is conserved. If all the space is allocated from the start, its reallocation can therefore increase the motor advantage of some control functions only when it decreases the motor advantage of others. For this reason, the provision of positive motor advantage will always be selective in the sense that it can be done only for a fraction of the control functions.

Display Distortion and Controlling Motor Advantage

Non-linear distortion of display space is a well-known method of providing focus and context in one seamless view [2, 3]. The simple and elegant hyperbolic function introduced by Sarkar and Brown [4] has been widely used, and is often called a fisheye view. It includes a parameter that governs the magnification at the focus.

In the beginning of 2001, Apple introduced the patented Dock [5], a userbar designed to contain a large number of icons and to provide "consolidation and access" [6]. When magnification is enabled, the Dock uses a distortion based on the sine function to enlarge the icons closest to the pointer. The others are made smaller, and moved away within the slightly expanded Dock. It was soon pointed out that even though this magnification made the icons easier to see, it made them no easier to select [7]. In other words, the distortion provided a visual advantage to the nearby icons, but no motor advantage at all.

In fact, Zhai et al showed that a fisheye magnification depending only on cursor position can have no pointing (=motor) advantage [1]. They suggested an improvement to the Dock scheme. The pointer movement is smoothed and fitted with a straight line to get the direction of motion and predict its intersection with the Dock's baseline. Only when the cursor is "close to the Dock," is the fisheye magnification activated, with its focus at the predicted intersection. On cursor entry into the Dock the focus position is kept unchanged "for at least one second" [1, p 183-4].

During that time of display freeze, the cursor position is presumably referred to the magnified boundaries of the icons, which provides a larger control apace for the closer ones, and therefore a motor advantage for them.

This discrete and time-based solution demonstrates two principles for deriving motor advantage that may be generalized, one essential and one optional:

Memory or hysteresis (essential)—The focus point position is remembered here, triggered on pointer entry into the Dock and forgotten after a set interval. During that interval, the stationary focus point position provides a fixed distortion of the display, within which the pointer can be moved without interacting with it as it docs otherwise.

Transfer of boundaries (optional)—While the memory is active, icon boundaries that would otherwise only be displayed, are used to determine control. This can be viewed as an elementary transfer of boundaries from display space to control space. Put another way, visual boundaries become activation boundaries.

In general, motor advantage via increase in control coverage for some control functions is not difficult to achieve. Control translations like scrolling and panning do not change the size of the control surfaces, until they are moved to the edge of reachable control space. We may define the latter as the user's motor space. Thus some controls may be scrolled into reach at the one extreme of motor space, while others are simultaneously scrolled out of reach at the opposite extreme. The control coverage is increased from zero in the first case and decreased to zero in the second case.

Control zooming changes the scale of controls relative to the motor space. Zooming in will increase the control coverage of controls near the centre of the zoom, giving them a motor advantage, while controls zoomed past the per meter of motor space will lose their control coverage. Zooming out has the opposite effect. Control rotation is not much used, but it could also be used to give motor advantage to a subset of functions.

We see that the linear operations of translation, rotation and sealing constitute simple ways of gaining motor advantage for some functions. The simultaneous gain in visual advantage from the linear operations is the same when the two advantages are kept coupled. For non-linear distortions, gains in visual and motor advantage become decoupled. If the distortion in display space were too tightly linked to control space distortion, positive feedback would result, with the control becoming unstable.

Non-linear methods for obtaining motor advantage other titan the one of Zhai et al mentioned above, have been proposed [8]. They all include the essential property of memory, but are based on techniques different from boundary transfer, like separate control of removing unlikely functions' control coverage and replacing the current control circle with another one when moving through a threshold.

The generalization of boundary transfer is a relatively unexplored topic. One example will be discussed next.

Controlling Motor Advantage Using Boundary Transfer

The Gauss app is a confidential and exploratory application created by RG for the iPad. It presents musical album covers on a circular line, and non-linearly distorts their positional relations based on a continuous touch input trajectory. When the user breaks contact with the screen, the display arrangement is frozen in the currently distorted state. If the user then touches a point on the screen removed from the one where the last contact was recorded, the control interpretation is guided by the display boundaries, and no longer by the earlier control boundaries. This can be interpreted as transfer of boundaries from display space to control space, and it creates a motor advantage for the albums magnified by the distortion. The distorted state constitutes the essential memory.

This technique differs from Zhai et al [1] proposal with regards to the application (music player vs user bar), the geometrical arrangement (circular vs linear), the activation method (contact break vs pointer entry into the Dock), the duration (one second vs indefinite) and the details of the distortion function (Gaussian vs sine based). The similarities include the achievement of motor advantage, the use of two discretely different nodes at two different times (first an interactive distortion mode then a frozen distortion mode) and the transfer of boundaries from display to control.

A New Method for Controlling Motor Advantage Using a Second Pointer

The following new method is proposed for controlling motor advantage in a distortion setting. Like the previously discussed methods it employs the technique of transferring boundaries, but it is based on the use of a second pointer, and it does the transfer in a continual way.

The first pointer is used for interactive distortion in the normal way. When a second pointing object is introduced, e.g. on a multi-touch device, it is tracked independently from the first. Its function is interpreted with respect to the visual boundaries created by the first pointer distortion, but these boundaries are taken as control boundaries for the second pointer. Thus the boundaries are transferred from the display space of the first pointer to the control space of the seeded pointer.

An app demonstrating this method has been created for the iPad. A QWERTY keyboard is displayed on a very small scale, too small for the letters to even be visible. The first finger activates a Sarkar & Brown distortion function with a high value of d=40, constrained to a circle in which only a few highly magnified keys are visible. Focus demagnification and double lensing [9] are used to improve focus targeting at this high magnification. An offset is provided from the touch point to the distortion focus, to avoid occlusion of the magnified keys. While keeping the first finger in place, the second finger is then used to touch any of the areas where the enlarged keys are displayed, entering the corresponding letter into the typing buffer. The first finger may then be moved to magnify other keys, which thereby become available for easy selection by the second finger.

Figure 2:
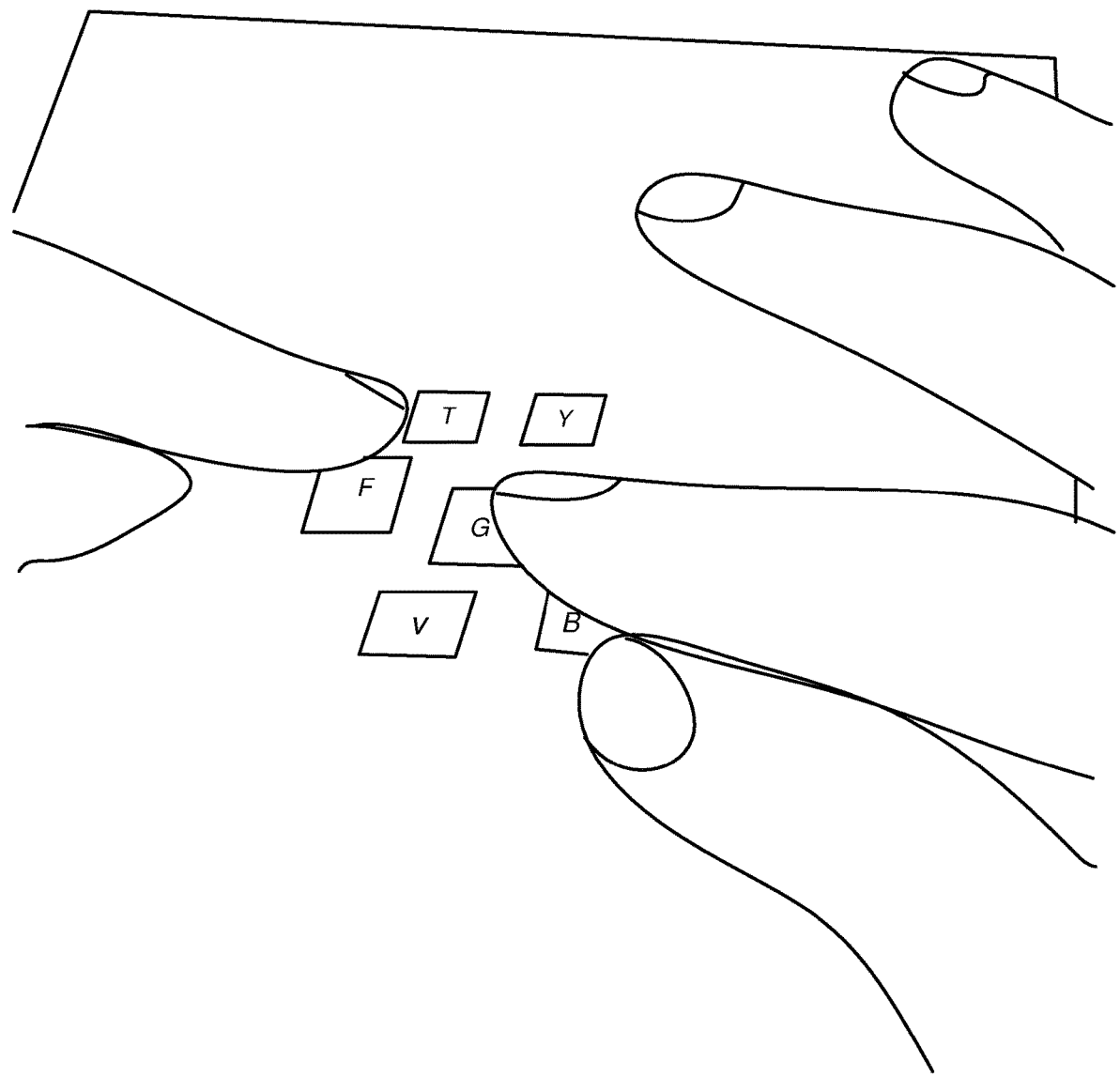
FIG. 2 is an example of typing a letter where continuous distortion is controlled with the left index finger sliding on glass and selection is done by tapping the softkey with the right index finger.

Using the method to type the letter "g" is illustrated in FIG. 2, where the index finger of the left hand is used for distortion and that of the right hand for selection. While typing is perhaps not the best application of this method, it demonstrates that it works well. Choosing one among a large number of very small items on a rectangular grid would also be possible in this way, possibly allowing interaction with and selection from up to 10 000 items on a screen the sin of the iPad.

The novelty of this method lies in using two pointers instead of one, separating distortion from selection in space rather than time and providing continual transfer of boundaries instead of a discrete once-off transfer.

A novel result of this method is that the distortion need not be frozen, but remains dynamically controllable, because the boundaries resulting from it are continually transferred to the control space of the second pointer, enabling selection with obvious motor advantage.

See FIG. 2. Typing the letter "g": continuous distortion is controlled with the left index finger sliding on the glass, selection is then done by tapping the softkey with the right index finger

REFERENCES

[1] Shumin Zhai, Stéphane Conversy, Michel Beaudouin-Lafon, and Yves Guiard. "*Human on-line response to target expansion,*"Proc. SIGCII Conf. Human Factors in Computing Systems (CHI '03), ACM, New York, N.Y., USA. 2003, pp 177-184.

[2] Leung, Y, and Apperley, M. "*A Review mid Taxonomy of Distortion-Oriented Presentation Techniques,*" ACM T. CHI Vol 1 No 2, 1994, pp 126-160.

[3] Cockburn, A, Karlson, A. and Bederson. B B, "*A review of overview+detail, zooming, and focus-context interfaces,*" ACM CSUR Vol. A No 1, 2008, pp 1-31.

[4] Sarkar. M., & Brown, M. "Graphical Fisheye Views of Graphs, Proc. ACM CHI'92, pp 83-91.

[5] "*Apple—Mac Os X—Theater—Meet the Dock*" http://web.archive.org/web/20010123211200/http://www.apple.com/macosx/theater/dock.html

[6] Ording B. Jobs S P, Lindsay D J, "User interface for providing consolidation and access", U.S. Pat. No. 7,434,177. Oct. 7, 2008.

[7] Michael McGuffin and Ravin Balakrishnan, "*Acquisition of expanding targets,*" Proc. SIGCHI Conf. Human Factors in Computing Systems (CHI '02). ACM, New York, N.Y. USA. 2003, pp 57-64.

[8] Boshoff, H F V, "*Controlling die tradeoff between speed of navigation and ease of selection,*" RealityGate, RG-C Introduction, December 2012

[9] Boshoff, H F V, "*Distortion viewing with improved focus targeting,*" RealityGate, RG-N1 introduction, February 2013

Example 2

Dynamic Transfer from Display to Control with Interpolation

This second example uses the three dimensional Leap Motion input device and an application programmed in Python. A grid of tiles are displayed on the screen, and controlled by moving a finger in the space in front of the screen. Three regions are defined in relation to the screen: far, transition and near, in the transition region, dynamic transfer from display to control is performed, with interpolation.

Figure 4:
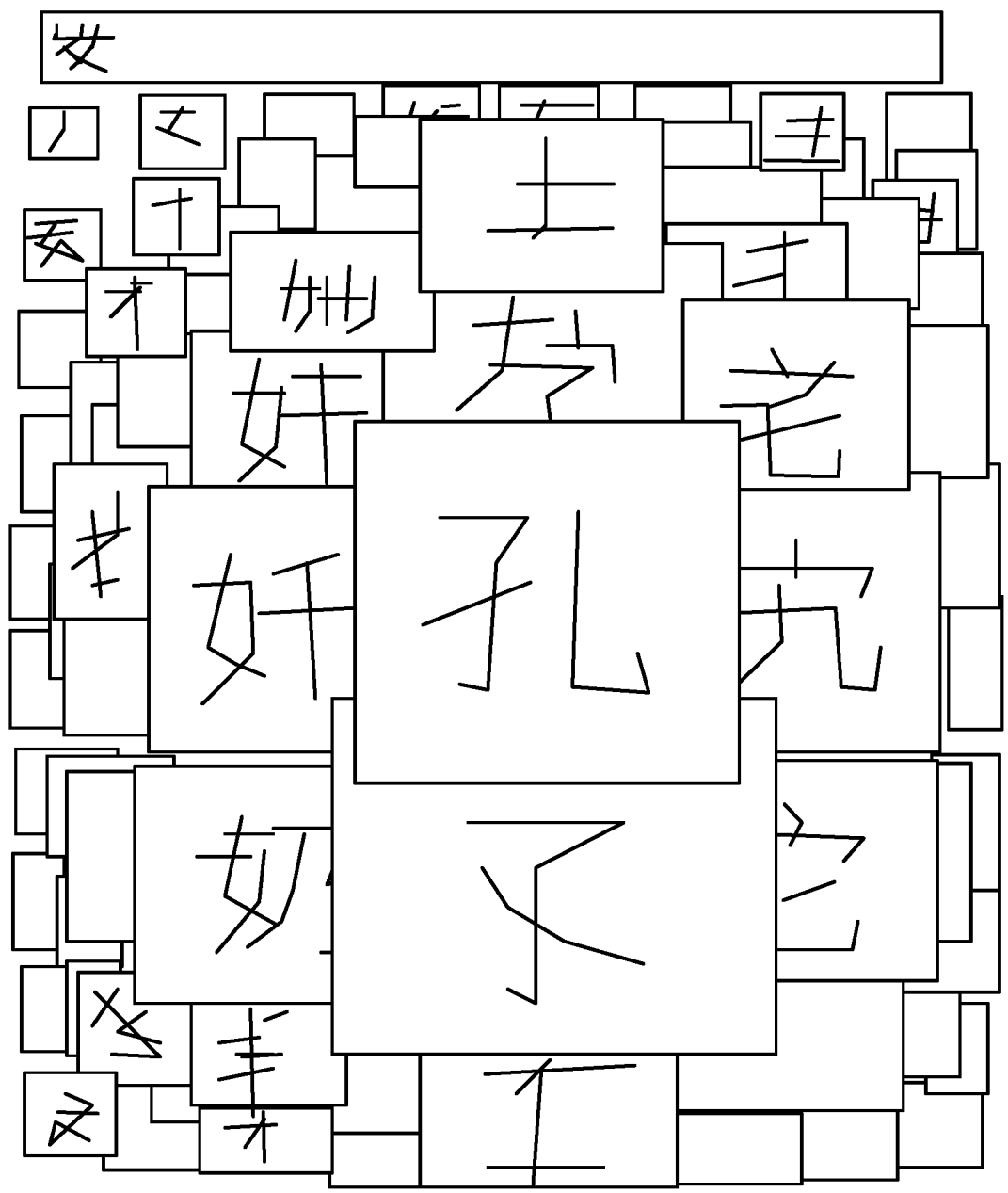
FIG. 4 is a display of provisional display coordinates of the tiles of FIG. 3 after distortion is used to determine variable control coordinates.

The app initially receives the first control coordinates of a plurality of tiles. These coordinates extend into the z-space above the screen, it also receives the tile's initial (x, y) display coordinates, which are on the screen, and thus different from the first control coordinates. The initial display is shown in FIG. 3. The pointer coordinates in this case are the (x, y, z) values of the position of the finger tip, as measured by the Leap Motion device. Upon receiving these pointer coordinates, and if they fail in the transition region, the tiles are variously displaced and some of them are differentially enlarged. This distortion amounts to individualised control of the tiles, which get new (provisional) display coordinates partly based on their first control coordinates. The provisional display coordinates of the tiles after distortion (see FIG. 4) are used to determine variable control coordinates, in this case different from the provisional display coordinates, but also different from the first control coordinates. All these steps are continuously repeated as the fingertip moves and new pointer coordinates become available. When the pointer coordinates cross the threshold between the transition and near regions, the variable control coordinates are fixed as the new control coordinates. Changes in pointer coordinates inside the near region are interpreted in the context of these new control coordinates, to determine e.g. which tile is selected at a further threshold.

Figure 5:
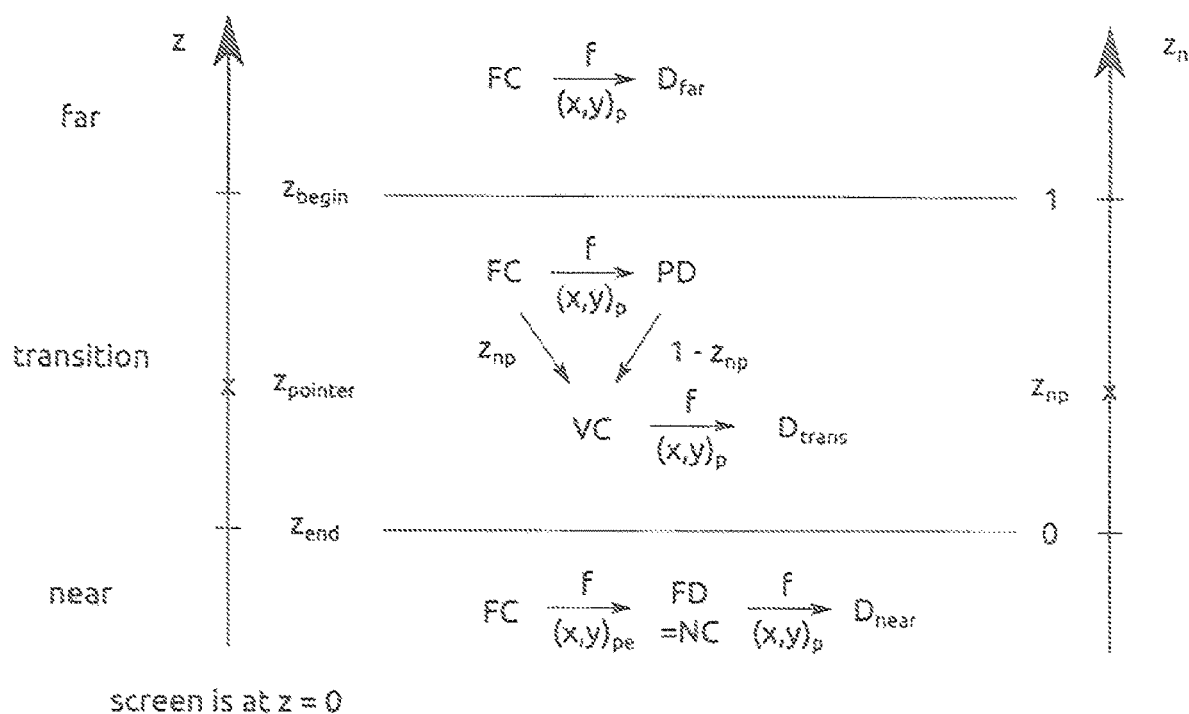
FIG. 5 is a diagram illustrating transfer from display to control.

The dynamic nature of this example is difficult to convey with snapshots, and the app should be used first-hand to experience the degree of control it offers. See FIG. 3. Screen shot of the initial display and FIG. 4. Screen shot of the distorted display This example uses smooth interpolation between a far z-region, in which no display to control transfer takes place, and a near region, where the transfer is kept fixed at the value determined by the coordinates of the entry point of the cursor. FIG. 5 illustrates this process for the case of linear interpolation. Non-linear interpolation can easily be accomplished by first distorting the normalized z-coordinate $z_n$, via a monotonic transformation function having fixed points at −1, 0 and 1.

See FIG. 5. Diagram illustrating transfer from display to control, (a) No D-C transfer in the far region, (b) Dynamic D-C transfer by linear interpolation in the transition region (c) Transfer from display position of the fixed entry point into the near region.

This interaction assumes a three dimensional input device like the Leap Motion sensor or Fogale's Sensation, used to track a single finger point of the user in three dimensions. A transfer of object coordinates in x and y takes place from display to control, governed by the z-value. The coordinates are the position and size in x and y of each item.

The symbols used in the diagram of FIG. 3 have the following interpretation:

x, y: dimensions parallel to the display screen
z: perpendicular distance from the display screen
f: distortion function mapping control to display coordinates
$(x, y)_p$, $z_p$: coordinates of the point tracked by the input device
$z_{begin}$: start of the transition region
$z_n$: end of the transition region
$z_{np}$: z-coordinates normalized with respect to ($z_{begin}$-$z_{end}$)
$z_{np}$: normalized z-coordinate of the tracked point:

$$z_{np} = \frac{z_p - z_{end}}{z_{begin} - z_{end}}$$

FC: fixed control coordinates allocated before the interaction starts
$D_{far}$: display coordinates in the far region: $D_{far}=f(FC, x_p, y_p)$
PD: provisional display coordinates used in the transition region: $PD=f(FC, x_p, y_p)$
VC: variable control coordinates used in the transition region: $VC=z_{np}FC+(1-z_{np})PD$ This is where some information transfer from display to control coordinates takes place in the transition region, using linear interpolation.
$D_{trans}$: display coordinates in the transition region: $D_{trans}=f(VC, x_p, y_p)$
FD: fixed display coordinates where the pointer entered the near region. $FD=f(FC, x_{pe}, y_{pe})$
NC: new control coordinates used in the near region: NC=FD This is where the information transfer from display to control coordinates takes place in the near region.
$D_{near}$: display coordinates in the near region: $D_{near}=f(NC, x_p, y_p)$ A basic feature of this method is the iterated application of the distortion function f. This iteration can have the undesirable effect of yielding displacements in x and y that are too large. Therefore, the object sizes derived from the second iteration are generally used, while the resulting positions may be discarded and replaced by those calculated in the first iteration. The implementation of this method in Python confirmed that this approach leads to a more pleasing visual effect.

The main novelty of this method lies in the treatment of the transition region, where information is gradually and dynamically transferred from display to control in such a way that the visual positions of objects change smoothly when the tracked point moves from far to near through the two thresholds at $z_{begin}$ and $z_{end}$.

When the trajectory of the tracked object is reversed, a discontinuity will occur when the point at which it leaves the near region is different from the one where it entered. The discontinuity is proportional to the absolute distance between the two points, and its visual effect may be ameliorated by a brief computer animation of duration 100 to 200 ms. This is the only circumstance under which animation is used in this method. All other object movements are directly under user control via the tracking device.

The invention claimed is:

1. A method for human-computer interaction on a graphical user interface (GUI), which method includes the steps of:
   displaying a plurality of objects at initial positions;
   receiving first-pointer coordinates of a first pointer controlled by a user;
   using a distortion function to calculate an updated display position and an updated size for each of the plurality of objects, the updated display position and the updated size for an object of the plurality of objects based on an initial position of the object and the first pointer coordinates, the updated display position of the object different from an initial position of the object;
   displaying the plurality of objects at corresponding updated display positions with corresponding sizes;
   continuously repeating the above steps each time new first pointer coordinates are received;
   receiving second pointer coordinates for a second pointer controlled by the user, the second pointer different than the first pointer, the second pointer coordinates received while the updated display positions and the updated sizes are calculated;
   responsive to receiving a selection action by the user, selecting a selected object of the plurality of objects based on the second pointer coordinates and most recently updated display positions and updated sizes for each of the plurality of objects.

2. A method for human-computer interaction as claimed in claim 1, wherein receiving the first pointer coordinates includes activation of one or more control functions associated with each of the objects.

3. A method for human-computer interaction as claimed in claim 1, wherein the updated display positions are laterally displaced relative to the first pointer coordinates.

4. A method for human-computer interaction as claimed in claim 1, wherein the first pointer coordinates differ from the updated display positions of the objects along a z-axis, placing the first pointer coordinates above a display or screen on which the plurality of objects are displayed.

5. A method for human-computer interaction as claimed in claim 1, further comprising:
   establishing a threshold with regard to each object or each of a group of objects, wherein the objects are controlled by the new control coordinates after the threshold is reached.

6. A method comprising:
   displaying a plurality of objects at initial positions in a graphical user interface (GUI);
   receiving pointer coordinates of a pointer controlled by a user;
   determining a distance of the pointer above a screen displaying the plurality of objects;
   responsive to the distance of the pointer above the screen being greater than a first threshold distance and greater than a second threshold distance, using a distortion function to calculate an updated display position and an updated size for each of the plurality of objects, the updated display position and the updated size for an object of the plurality of objects based on an initial position of the object and the pointer coordinates, the updated display position of the object different from an initial position of the object;
   responsive to the distance of the pointer above the screen being less than the first threshold distance and greater than the second threshold distance, using the distortion function to calculate a provisional position for each of the objects, combining the initial position of each object with the provisional position for a corresponding object into a control position via interpolation, and using a second distortion function to calculate the updated display position and the updated size of each object based on the control position of each object and the pointer coordinates;
   responsive to the distance of the pointer above the screen being less than the first threshold distance and less than the second threshold distance, using the distortion function to calculate the control position for each object based on the initial position of the objects and coordinates of the pointer when the pointer is initially less than the second threshold distance from the screen and using the second distortion function to calculate the updated display position and the updated size of each object based on the control positions of the objects and the pointer coordinates;
   displaying the plurality of objects at corresponding updated positions with corresponding sizes;
   continuously repeating the above steps each time new pointer coordinates are received;
   responsive to determining the pointer has reached an additional threshold above the screen, selecting a selected object of the plurality of objects based on the pointer coordinates and most recently updated display positions and updated sizes for each of the plurality of objects.

* * * * *

UNITED STATES PATENT AND TRADEMARK OFFICE
CERTIFICATE OF CORRECTION

PATENT NO. : 10,572,099 B2  
APPLICATION NO. : 15/120242  
DATED : February 25, 2020  
INVENTOR(S) : Hendrik Frans Verwoerd Boshoff et al.

Page 1 of 1

It is certified that error appears in the above-identified patent and that said Letters Patent is hereby corrected as shown below:

In the Claims

Column 11, Line 52, In Claim 2, delete "A" and insert --The--

Column 11, Line 56, In Claim 3, delete "A" and insert --The--

Column 11, Line 59, In Claim 4, delete "A" and insert --The--

Column 12, Line 3, In Claim 5, delete "A" and insert --The--

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*